(12) United States Patent
Kim et al.

(10) Patent No.: US 11,623,605 B1
(45) Date of Patent: Apr. 11, 2023

(54) AIRBAG DEVICE

(71) Applicants: Hyundai Motor Company, Seoul (KR); Kia Corporation, Seoul (KR)

(72) Inventors: Se Ho Kim, Seoul (KR); Eung Man Kim, Hwaseong-si (KR); Kap Seong Jung, Hwaseong-si (KR); Yong Tae Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/868,277

(22) Filed: Jul. 19, 2022

(30) Foreign Application Priority Data

Dec. 16, 2021 (KR) .......................... 10-2021-0180805

(51) Int. Cl.
*B60R 21/239* (2006.01)
*B60R 21/2338* (2011.01)

(52) U.S. Cl.
CPC ........ *B60R 21/239* (2013.01); *B60R 21/2338* (2013.01); *B60R 2021/23384* (2013.01)

(58) Field of Classification Search
CPC .............. B60R 21/239; B60R 21/2338; B60R 2021/23384; B60R 2021/23388
See application file for complete search history.

(56) References Cited

U.S. PATENT DOCUMENTS

2010/0052297 A1* 3/2010 Fukawatase .......... B60R 21/239
280/732

FOREIGN PATENT DOCUMENTS

| DE | 102012006430 A1 | * | 10/2013 | ......... B60R 21/2338 |
| JP | 2009040206 A | * | 2/2009 | ......... B60R 21/2338 |
| JP | 6574554 B2 | * | 9/2019 | ........... B60R 21/239 |
| KR | 10-2015-0115500 A | | 10/2015 | |

* cited by examiner

*Primary Examiner* — Drew J Brown
(74) *Attorney, Agent, or Firm* — Morgan, Lewis & Bockius LLP

(57) ABSTRACT

An airbag apparatus includes an airbag cushion including a sub-vent hole, an opening/closing panel temporarily attached to the airbag cushion, and a tether including one end portion fixed to the airbag cushion and the other end portion fixed to the opening/closing panel, in which tension applied to the tether by a force for inflating the airbag cushion allows the tether to pull the opening/closing panel toward the sub-vent hole to close the sub-vent hole, and additional tension applied to the tether by an additional force loaded onto the airbag cushion allows the tether to additionally pull the opening/closing panel and separate the opening/closing panel in a detachably attached state from the airbag cushion to open the sub-vent hole.

12 Claims, 4 Drawing Sheets

AIRBAG DEVICE

CROSS-REFERENCE TO RELATED APPLICATION

The present application claims priority to Korean Patent Application No. 10-2021-0180805, filed Dec. 16, 2021, the entire contents of which is incorporated herein for all purposes by this reference.

BACKGROUND OF THE PRESENT DISCLOSURE

Field of the Present Disclosure

The present disclosure relates to an airbag device that opens a sub-vent hole by use of a force of an airbag restraining a passenger, reducing an injury to the passenger while improving opening/closing operability of the sub-vent hole.

Description of Related Art

Significant changes in interiors of vehicles resulting from introduction of autonomous driving vehicles are expected. Such significant changes are made in response to introduction of slim cockpits, long sliding, relax seats, and the like to improve dwelling ability for passengers.

There is a demand for research on an airbag configured for protecting a passenger under a condition satisfying regulations, marketability, and usability for users in the event of a collision regarding interior user experience (UX).

Meanwhile, a high pressure is required to deploy a passenger airbag (PAB), but the pressure for deploying the PAB may cause an injury to the passenger.

Therefore, evaluations based on regulations related to low-risk deployment (LRD) are performed to reduce injuries to passengers.

For example, an LRD vent has been used to reduce a cushion deployment pressure at the initial time of deploying an airbag and maintain an internal cushion pressure in the latter part of the deployment.

Furthermore, to reduce the injury to the passenger, a system is applied to reduce a pressure by separately adding an active vent configured to adjust the pressure when the PAB restrains the passenger.

However, the active vent needs to be maintained in a closed state (a state in which the active vent is held by a strap and a pin) and then opened at a desired point in time to ensure an initial PAB deployment pressure. For the present reason, a structure for releasing the pin and a design structure for receiving a signal from an airbag control unit (ACU) need to be additionally applied.

Therefore, the active vent has a disadvantageous layout compared to a PAB housing in the related art. Furthermore, because different signals need to be inputted in accordance with positions of a dummy, there is an inconvenience of having to consistently evaluate and check which point in time is an optimum point in time.

Furthermore, in a case in which both the active vent and the LRD vent are applied simultaneously, there is a problem in that a degree of freedom related to sizes and positions of the vents deteriorates, and a degree of shape freedom deteriorates at the time of designing the airbag.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an airbag apparatus that opens a sub-vent hole by use of a force of an airbag restraining a passenger, reducing an injury to the passenger while improving opening/closing operability of the sub-vent hole.

To achieve the above-mentioned object, various aspects of the present disclosure are directed to providing an airbag apparatus including: an airbag cushion including a sub-vent hole; a panel detachably attached to the airbag cushion; and a tether including a first end portion fixed to the airbag cushion and a second end portion fixed to the panel, in which tension applied to the tether by a force for inflating the airbag cushion allows the tether to pull the panel toward the sub-vent hole to close the sub-vent hole, and additional tension applied to the tether by an additional force loaded onto the airbag cushion allows the tether to additionally pull the panel and separate the panel in a detachably attached state from the airbag cushion to open the sub-vent hole.

The tether may be provided in a direction in which the airbag cushion is deployed, the tension may be provided to the tether, and the airbag apparatus may further include a tether guide configured to guide the tether along an internal surface of the airbag cushion.

The tether guide may be provided on the internal surface of the airbag cushion and have a tunnel shape so that the tether passes through the tether guide.

The tether may be positioned at a portion onto which the passenger is loaded.

The tether may extend from a side adjacent to the passenger to a side opposite to the passenger along an internal surface of a lower portion of the airbag cushion.

The panel may be folded in a form of a roll or fold, and the panel may be unfolded while being pulled toward the sub-vent hole by the tether.

The sub-vent hole may be a vent hole that implements low-risk deployment (LRD) performance.

A fixed part may be formed as one end portion of the tether is sewn to an internal surface of an upper end portion of the airbag cushion.

According to an exemplary embodiment of the present disclosure, the sub-vent hole is kept closed at the initial time of deploying the airbag, and then the sub-vent hole is mechanically opened by the tether and the panel during the process in which the passenger is loaded onto the airbag cushion and restrained.

As a result, the sub-vent hole is opened or closed without a device such as an active vent or a device for additionally applying an operational signal, which makes it possible to improve opening/closing operability of the sub-vent hole and effectively reduce an injury to the passenger.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
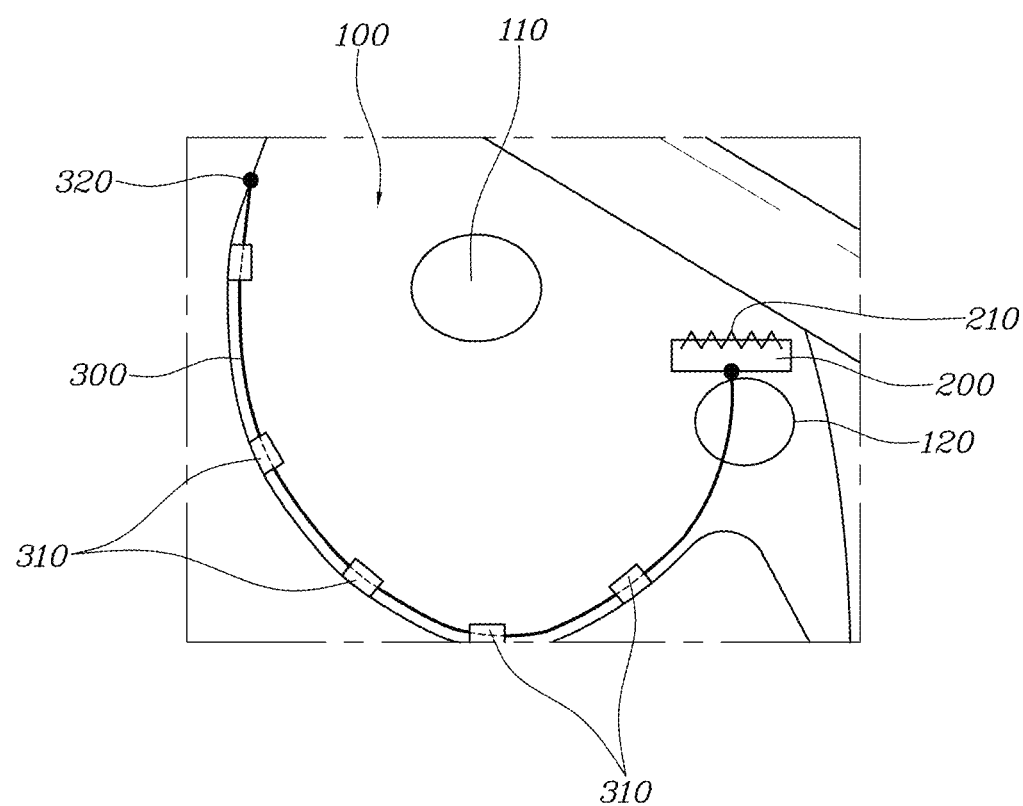
FIG. 1 is a view exemplarily illustrating a state in which an airbag cushion according to an exemplary embodiment of the present disclosure is initially deployed.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of embodiments of the present disclosure included in the exemplary embodiment or application are exemplified only for explaining the exemplary embodiments according to an exemplary embodiment of the present disclosure, the exemplary embodiments of the present disclosure may be conducted in various forms, and it should not be interpreted that the present disclosure is limited to the exemplary embodiments described in the exemplary embodiment or application.

Because the exemplary embodiments of the present disclosure may be variously changed and may have various forms, specific embodiments will be illustrated in the drawings and described in detail in the exemplary embodiment or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is referred to as being "coupled" or "connected" to another constituent element, it should be understood that one constituent element may be coupled or directly connected to another constituent element, and an intervening constituent element can also be present between the constituent elements. When one constituent element is referred to as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the exemplary embodiment are used only for describing various exemplary embodiments and are not intended to limit the present disclosure. Singular expressions include plural expressions unless clearly referred to as different meanings in the context. In the exemplary embodiment, it may be understood the terms "includes," "including," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains. The terms such as those defined in a commonly used dictionary should be interpreted as having meanings consistent with meanings in the context of related technologies and should not be interpreted as ideal or excessively formal meanings unless explicitly defined in the exemplary embodiment of the present disclosure.

Hereinafter, various exemplary embodiments of the present disclosure will be described in detail with reference to the accompanying drawings.

Figure 2:
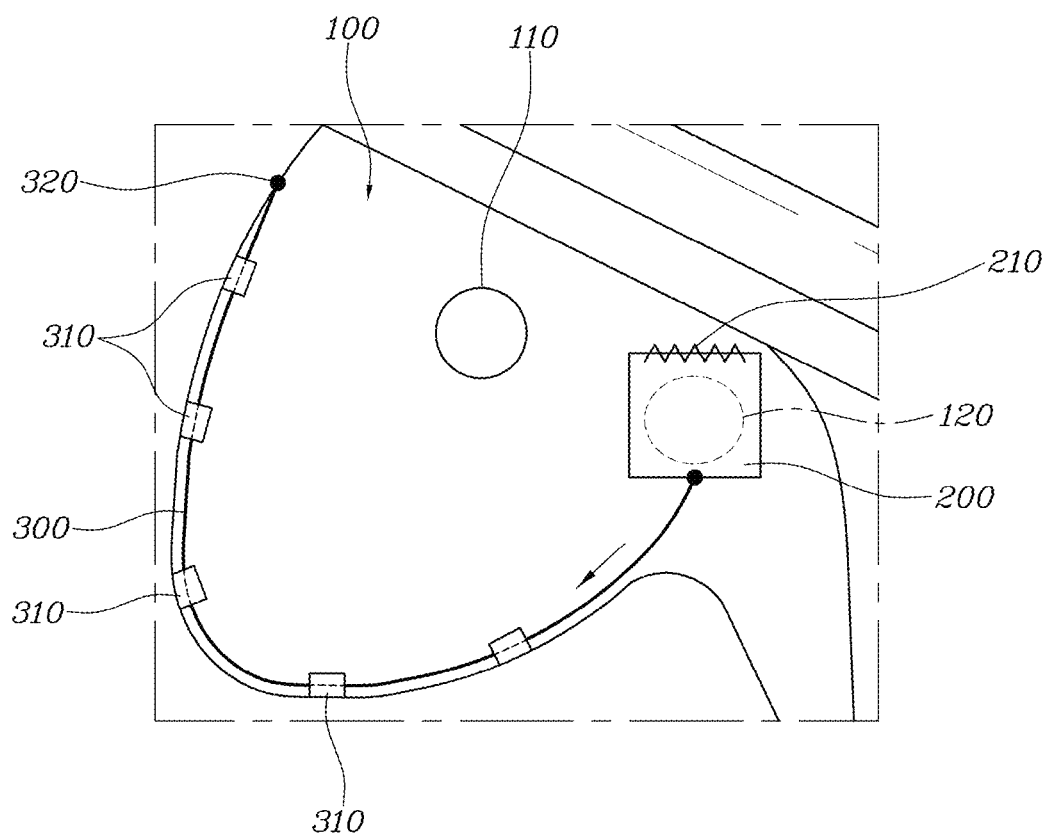
FIG. 2 is a view exemplarily illustrating a state in which the airbag cushion according to an exemplary embodiment of the present disclosure is fully deployed after being initially deployed.
Figure 3:
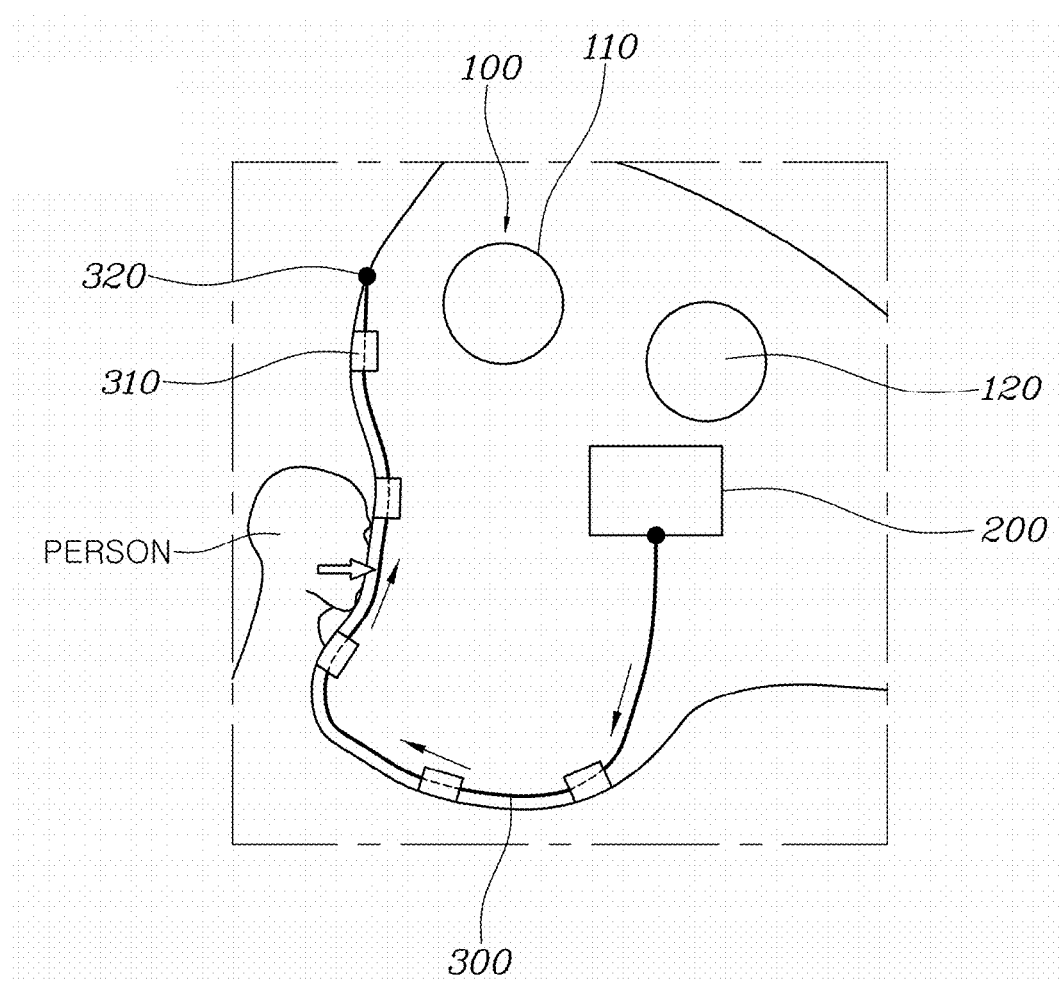
FIG. 3 is a view exemplarily illustrating a state in which a passenger is restrained after the airbag cushion according to an exemplary embodiment of the present disclosure is fully deployed.

FIG. 1 is a view exemplarily illustrating a state in which an airbag cushion 100 according to an exemplary embodiment of the present disclosure is initially deployed, FIG. 2 is a view exemplarily illustrating a state in which the airbag cushion 100 according to an exemplary embodiment of the present disclosure is fully deployed after being initially deployed, and FIG. 3 is a view exemplarily illustrating a state in which a passenger is restrained after the airbag cushion 100 according to an exemplary embodiment of the present disclosure is fully deployed.

Referring to the drawings, an airbag device according to various exemplary embodiments of the present disclosure may include an airbag cushion 100 including a sub-vent hole 120; an opening/closing panel 200 temporarily attached to the airbag cushion 100; and a tether 300 including one end portion fixed to the airbag cushion 100 and the other end portion fixed to the opening/closing panel 200, in which tension applied to the tether 300 by a force for inflating the airbag cushion 100 allows the tether 300 to pull the opening/closing panel 200 toward the sub-vent hole 120 to close the sub-vent hole 120, and additional tension applied to the tether 300 by a force made by a passenger loaded onto the airbag cushion 100 allows the tether 300 to additionally pull the opening/closing panel 200 and separate the opening/ closing panel 200 in a temporarily attached state from the airbag cushion 100 to open the sub-vent hole 120.

For example, the airbag cushion 100 may be an airbag cushion 100 provided in a driver airbag device or a passenger airbag device. Main vent holes 110 are respectively formed in two opposite surfaces of the airbag cushion 100, and gas in the airbag cushion 100 is discharged to the outside through the main vent holes 110 at a point in time at which a passenger is loaded.

Furthermore, the sub-vent holes 120 are vent holes formed at two opposite sides of the airbag cushion 100 together with the main vent holes 110 and implement LRD performance. The sub-vent holes 120 are formed at front or rear sides of the two main vent holes 110. The sub-vent hole 120 is configured to protect the passenger by discharging the gas in the airbag cushion 100 to the outside through the sub-vent hole 120 at a point in time at which the passenger is loaded.

Furthermore, the opening/closing panel 200 is made of the same material as the airbag cushion 100 and temporarily attached to an internal surface of the airbag cushion 100 by sewing. A fixed level of a temporarily attached portion 210 needs to allow the temporarily attached portion to be separated by tension applied to the tether 300.

Furthermore, the opening/closing panel 200 needs to have an area at least greater than a diameter of the sub-vent hole 120 so that the opening/closing panel 200 may cover and block the sub-vent hole 120.

A fixed portion 320 is formed as one end portion of the tether 300 is sewn onto an internal surface of an upper end portion of the airbag cushion 100 directed toward the passenger. The other end portion of the tether 300 is fixed to the opening/closing panel 200 so that the force for inflating the airbag cushion 100 provides tension to the tether 300.

That is, one end portion of the tether 300 is fixed to the fixed portion 320 formed on the internal surface of the upper end portion of the airbag cushion 100, and the other end portion of the tether 300 is fixed to the opening/closing panel 200. Therefore, an inflation force for deploying the airbag cushion 100 at the initial time of deploying the airbag cushion 100 applies tension to the tether 300 and pulls the tether 300 so that the opening/closing panel 200 is also pulled toward the sub-vent hole 120.

Therefore, the airbag cushion 100 is rapidly inflated and deployed as the sub-vent hole 120 is blocked by the opening/closing panel 200 after the airbag cushion 100 is initially deployed.

Furthermore, when the passenger is loaded onto the airbag cushion 100, a load of the passenger is applied to the tether 300 because one end portion of the tether 300 is fixed to the airbag cushion 100 by the fixed portion 320 so that additional tension is applied to the tether 300.

Therefore, the opening/closing panel 200 is additionally pulled together with the tether 300 so that the temporarily attached portion 210 of the opening/closing panel 200, which blocks the sub-vent hole 120, is separated, and the sub-vent hole 120 is opened, safely restraining the passenger.

As described above, in an exemplary embodiment of the present disclosure, the sub-vent hole 120 is kept opened at the initial time of deploying the airbag cushion 100, as illustrated in FIG. 1.

However, as illustrated in FIG. 2, the sub-vent hole 120 is kept closed by the tether 300 during the process of fully deploying the airbag cushion 100.

Furthermore, as illustrated in FIG. 3, the sub-vent hole 120 is mechanically opened by the tether 300 and the opening/closing panel 200 during the process in which the passenger is loaded onto the airbag cushion 100 and restrained.

Therefore, the sub-vent hole 120 is opened or closed without a device such as an active vent or a device for additionally applying an operational signal. Therefore, it is possible to improve opening/closing operability of the sub-vent hole 120 and effectively reduce an injury to the passenger.

Furthermore, in an exemplary embodiment of the present disclosure, the tether 300 further includes tether guides 310 provided in a direction in which the airbag cushion 100 is deployed, and the tether guides 310 receive the tension and guide the tether 300 along the internal surface of the airbag cushion 100.

For example, as illustrated in FIG. 1, in the case of the airbag cushion 100 configured to be deployed from a crash pad toward the passenger, the airbag cushion 100 is deployed in a forward/rearward direction of a vehicle. Therefore, the tether 300 is also provided in the forward/rearward direction of the airbag cushion 100, and the tension is applied to the tether 300 by the force for inflating the airbag cushion 100.

The tether 300 is pulled and moved by the tension applied to the tether 300, and the tether 300 is moved along the internal surface of the airbag cushion 100 by the tether guides 310.

Therefore, the opening/closing panel 200 fixed to the tether 300 is also pulled in a state in which the opening/closing panel 200 is in close contact with the internal surface of the airbag cushion 100. Therefore, the opening/closing panel 200 is moved along the internal surface of the airbag cushion 100 and covers the sub-vent hole 120, more assuredly blocking the sub-vent hole 120 and preventing the gas in the airbag cushion 100 from being discharged through the sub-vent hole 120.

Figure 4:
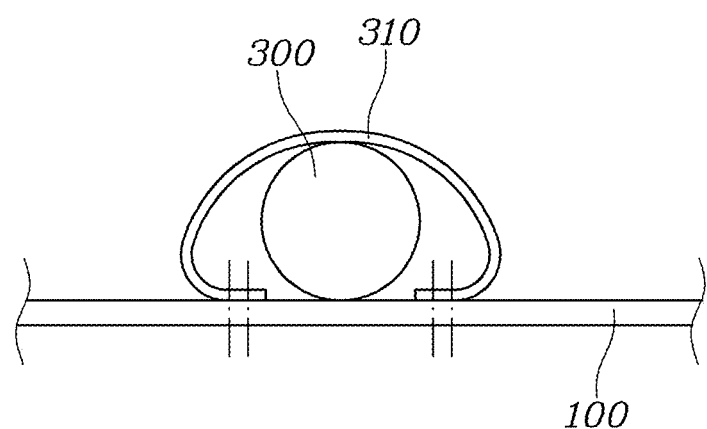
FIG. 4 is a view exemplarily illustrating a shape of a tether guide according to an exemplary embodiment of the present disclosure.

FIG. 4 is a view exemplarily illustrating a shape of the tether guide according to an exemplary embodiment of the present disclosure.

Referring to the drawings, the tether guide 310, which is configured to guide the tether 300, is provided on the internal surface of the airbag cushion 100 and has a tunnel shape. The tether guide 310 may be configured so that the tether 300 passes through the tether guide 310.

In an exemplary example, the tether guides 310 may be partially provided at multiple positions along a route on the internal surface of the airbag cushion 100 along which the tether 300 is provided.

The two opposite end portions of the tether guide 310 are fixed to the internal surface of the airbag cushion 100 by sewing so that a passageway is formed at a center portion of the tether guide 310, and the tether 300 is penetratively inserted into the passageway.

Therefore, the tether guide 310 guides the motion of the tether 300 so that the tether 300 may move in the state in which the tether 300 is in close contact with the internal surface of the airbag cushion 100.

For reference, the configuration has been described in which the tether guides 310 are provided at the multiple positions along the route of the tether 300. However, the entire tether guide 310 may be provided along the route of the tether 300, and the present configuration is also included in the configuration of the present disclosure.

Meanwhile, in the airbag device according to an exemplary embodiment of the present disclosure, the tether 300 may be positioned at a portion onto which the passenger is loaded.

For example, as illustrated in FIG. 3, in the case of the passenger airbag cushion 100, a part of the passenger's body including the passenger's head is loaded at a lower end portion of the airbag cushion 100 adjacent to the passenger.

Therefore, the tether 300 is provided so that a middle portion of the tether 300 passes through the lower end portion of the airbag cushion 100 adjacent to the passenger. When the passenger is loaded onto the airbag cushion 100, the passenger's load pushes the middle portion of the tether 300, and the middle portion of the tether 300 is pressed toward the inside of the airbag cushion 100 so that the tether 300 is pulled toward the pressed middle portion of the tether 300.

Therefore, the additional tension is provided to the tether 300, and the temporarily attached portion 210 of the opening/closing panel 200 temporarily attached to the airbag cushion 100 is separated so that the opening/closing panel 200, which blocks the sub-vent hole 120, does not block the sub-vent hole 120 any Furthermore, and the sub-vent hole 120 is opened.

Furthermore, the tether 300 may be provided in a shape extending from a side adjacent to the passenger to a side opposite to the passenger along an internal surface of a lower portion of the airbag cushion 100.

That is, in the case of the passenger airbag cushion 100, one end portion of the tether 300 is fixed to the internal surface of the airbag cushion 100 adjacent to the passenger, and the other end portion of the tether 300 is fixed to the opening/closing panel 200 on the internal surface of the airbag cushion 100 opposite to the passenger.

The middle portion of the tether 300 extends along the internal surface of the lower portion of the airbag cushion 100 between one end portion thereof and the other end portion of the tether 300.

Therefore, when the passenger is loaded onto the airbag cushion 100, the middle portion of the tether 300 is pressed, and the tether 300 is pulled toward the pressed middle portion so that the additional tension is provided to the tether 300. Therefore, the temporarily attached portion 210 of the opening/closing panel 200 temporarily attached to the airbag cushion 100 may be separated, and the sub-vent hole 120 may be opened.

Meanwhile, in an exemplary embodiment of the present disclosure, the opening/closing panel 200 is folded in a form of a roll or fold, and the opening/closing panel 200 is unfolded by being pulled toward the sub-vent hole 120 by the tether 300.

For example, as illustrated in FIG. 1 and FIG. 2, because the opening/closing panel 200 is made of the same material as the airbag cushion 100, the opening/closing panel 200 may be fixed to be temporarily kept wound in a form of a roll or folded in a form of a fold.

The opening/closing panel 200, which is folded as described above, is temporarily attached to the internal surface of the airbag cushion 100 positioned adjacent to the sub-vent hole 120.

The other end portion of the tether 300 passes over the sub-vent hole 120 and then is fixed to the opening/closing panel 200. This is to allow the opening/closing panel 200 to close the sub-vent hole 120 when the opening/closing panel 200 is pulled by the tension applied to the tether 300.

That is, when the tension is applied to the tether 300 by the force for inflating the airbag cushion 100 at the initial time of deploying the airbag, the tether 300 pulls the opening/closing panel 200 so that the folded opening/closing panel 200 is deployed while being unfolded.

In the instant case, because the opening/closing panel 200 is provided adjacent to the sub-vent hole 120, the unfolded opening/closing panel 200 covers the sub-vent hole 120.

Therefore, the sub-vent hole 120 is closed to prevent the gas from being discharged through the sub-vent hole 120.

Hereinafter, an operation of opening or closing the sub-vent hole 120 will be described with reference to the accompanying drawings.

When the passenger airbag operates in the event of a vehicle collision, gas is injected into the airbag cushion 100 and the airbag cushion 100 is rapidly inflated and deployed at the initial time of deploying the airbag, as illustrated in FIG. 1.

In the instant case, because the force for inflating the airbag cushion 100 is not yet applied to the tether 300, the tether 300 does not pull the opening/closing panel 200, and the sub-vent hole 120 is kept open. Therefore, the gas is discharged through the sub-vent hole 120 and the internal pressure decreases until the airbag cushion 100 is fully deployed.

Next, as illustrated in FIG. 2, the force for inflating the airbag cushion 100 provides the tension to the tether 300 during the process in which the airbag cushion 100 is fully deployed after the airbag cushion 100 is initially deployed.

In the present state, the tether 300 pulls the opening/closing panel 200 by the tension applied to the tether 300 because one end portion of the tether 300 is fixed to the internal surface of the airbag cushion 100 adjacent to the passenger and the other end portion of the tether 300 is fixed to the opening/closing panel 200 at the side of the airbag cushion 100 opposite to the passenger.

Accordingly, the opening/closing panel 200, which is folded in a form of a roll, is deployed while being unfolded toward the sub-vent hole 120, and the opening/closing panel 200 covers the sub-vent hole 120 and prevents a discharge of gas through the sub-vent hole 120 because the opening/closing panel 200 is provided adjacent to the sub-vent hole 120.

Therefore, the internal pressure of the airbag cushion 100 is maintained until a point in time at which the passenger is loaded onto the airbag cushion 100 is reached.

Next, as illustrated in FIG. 3, when the passenger's head portion is loaded onto the airbag cushion 100 after the airbag cushion 100 is fully deployed, the middle portion of the tether 300 is pushed toward the inside of the airbag cushion 100. As the middle portion of the tether 300 is pushed toward the inside of the airbag cushion 100, the tether 300 is pulled toward the pushed middle portion.

Accordingly, the additional tension is provided to the tether 300, and the temporarily attached portion 210 of the opening/closing panel 200 temporarily attached to the airbag cushion 100 is separated so that the opening/closing panel 200, which blocks the sub-vent hole 120, does not block the sub-vent hole 120 any further, and the sub-vent hole 120 is opened.

Therefore, it is possible to safely restrain the passenger and reduce a risk of injury to the passenger.

As described above, according to an exemplary embodiment of the present disclosure, the sub-vent hole 120 is kept closed at the initial time of deploying the airbag, and then the sub-vent hole 120 is mechanically opened by the tether 300 and the opening/closing panel 200 during the process in which the passenger is loaded onto the airbag cushion 100 and restrained. As a result, the sub-vent hole 120 is opened or closed without a device such as an active vent or a device for additionally applying an operational signal, which makes it possible to improve opening/closing operability of the sub-vent hole 120 and effectively reduce an injury to the passenger.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An airbag apparatus, comprising:
an airbag cushion including a sub-vent hole;
a panel detachably attached to the airbag cushion; and
a tether including a first end portion fixed to the airbag cushion and a second end portion fixed to the panel,
wherein tension applied to the tether by a force for inflating the airbag cushion allows the tether to pull the panel toward the sub-vent hole to close the sub-vent hole, and additional tension applied to the tether by an additional force loaded onto the airbag cushion allows the tether to additionally pull the panel and separate the panel in a detachably attached state from the airbag cushion to open the sub-vent hole.

2. The airbag apparatus of claim 1, wherein an area size of the panel is greater than a diameter of the sub-vent hole.

3. The airbag apparatus of claim 1, wherein the panel is made of a same material as the airbag cushion.

4. The airbag apparatus of claim 1, wherein the tether is provided in a direction in which the airbag cushion is deployed and the tension is provided to the tether.

5. The airbag apparatus of claim 4, wherein the airbag apparatus further includes a tether guide configured to guide the tether along an internal surface of the airbag cushion.

6. The airbag apparatus of claim 5, wherein the tether guide is provided on an internal surface of the airbag cushion and has a passage so that the tether passes through the tether guide.

7. The airbag apparatus of claim 5, wherein the tether is positioned at a portion onto which the passenger is loaded.

8. The airbag apparatus of claim 7, wherein the tether extends from a side adjacent to the passenger to a side opposite to the passenger along an internal surface of a lower portion of the airbag cushion.

9. The airbag apparatus of claim 4, wherein the airbag apparatus further includes tether guides provided at a plurality of positions on an internal surface of the airbag cushion and the tether is slidably coupled to the tether guides to guide the tether along the internal surface of the airbag cushion.

10. The airbag apparatus of claim 1, wherein the panel is folded in a form of a roll or fold, and the panel is unfolded while being pulled toward the sub-vent hole by the tether.

11. The airbag apparatus of claim 1, wherein the sub-vent hole is a vent hole that implements low-risk deployment (LRD) performance.

12. The airbag apparatus of claim 1, wherein a fixed portion is formed as one end portion of the tether is sewn to an internal surface of an upper end portion of the airbag cushion.

* * * * *